United States Patent [19]

Ingalls et al.

[11] 4,252,338
[45] Feb. 24, 1981

[54] APPARATUS METHOD FOR CORRECTING CAMBER OR CASTER

[75] Inventors: William E. Ingalls; Frank S. Bigelow, both of Longmont, Colo.

[73] Assignee: Niwot Corporation, Longmont, Colo.

[21] Appl. No.: 947,274

[22] Filed: Sep. 29, 1978

[51] Int. Cl.³ ............................................. B62D 17/00
[52] U.S. Cl. ..................................................... 280/661
[58] Field of Search ...................... 280/661; 180/43 R; 85/47, 1 L

[56] References Cited

U.S. PATENT DOCUMENTS

| 2,923,555 | 2/1960 | Kost | 280/661 |
|---|---|---|---|
| 4,026,578 | 5/1977 | Mattson | 280/661 |
| 4,037,680 | 7/1977 | Grove | 280/661 |
| 4,097,061 | 6/1978 | Dietlein | 85/47 |

Primary Examiner—Robert R. Song
Attorney, Agent, or Firm—O'Rourke & Harris

[57] ABSTRACT

A method and device for adjusting camber and caster in a solid axle steerable structure including a yoke, and a steering knuckle rotatably carried in the yoke by a pair of ball joints, by inserting a connecting offset and/or skewed bushing in at least one of the ball joint receiving openings in the yoke and positioning the connecting bushing to accommodate the steering knuckle in the desired, aligned position relative to the yoke.

15 Claims, 5 Drawing Figures

APPARATUS METHOD FOR CORRECTING CAMBER OR CASTER

BACKGROUND OF THE INVENTION

1. Field of the Invention

This invention relates to steering arrangements provided on solid axles, including steerable four-wheel drive solid axles, and more particularly pertains to a method and apparatus for adjusting caster and camber geometry at such yoke and steering knuckle arrangement.

2. Description of the Prior Art

Vehicles, such as trucks, four-wheel and front-wheel drive conveyances often employ a solid steerable front axle arrangement in which a yoke is fixedly attached to the solid axle. Pivoting means, such as ball joints, are interposed between the yoke and a steering knuckle which in turn carries a spindle upon which the wheel is mounted for rotation. When forces are introduced through, for instance, a steering arm, the steering knuckle pivots relative to the yoke and axle to provide steering at the attached wheels.

Caster and camber adjustments, particularly camber adjustments, are quite critical to proper road handling and tire wear. Particularly when wide, high floatation tires—such as are common on four-wheel drive vehicles—are employed, misadjustments of camber may cause only a limited portion of the bottom of the tire to contact the supporting surface. This results not only in greatly accelerated tire wear, but compromises safe handling on rigid highway surfaces, and may lead to overheating of the small contact patch of the tire at higher speeds. Heretofore only limited means have been available to adjust camber and essentially no means exist for accomplishing caster adjustments which influence straight line tracking and turning camber of the vehicle. Classically, the drawbacks of improper caster and camber adjustment have been accepted with high costs in tire wear and comprised road handling and safety. In some instances, particularly in non-four-wheel drive vehicles, camber has been adjusted by bending the solid axle to position the tire in a more or less desired camber arrangement. However, such bending has not been widely accepted in the case of four-wheel drive vehicles which employ a tubular axle housing. Space is not available to position a bending device on such tubular axle, and the hollow axle housing is subject to stress failure.

Another approach to adjusting camber is discussed in U.S. Letters Pat. No. 4,037,680 issued July 26, 1977, to Clinton E. Grove. According to such prior patent a tapered shim is introduced between the spindle mounting means and the spindle to provide for adjustment of the angular position of the spindle relative to the solid axle and yoke. However, to accomplish such adjustment, the hub, spindle and other associated wheel mounting means must be first removed. Accordingly, a great deal of work is involved in positioning such shims. Since the shim does not change the steering geometry, no change in caster alignment is possible with such a system. Accordingly, such shims, though operable and a worthwhile improvement over the entire absence of a workable camber adjustment, are inconvenient and time consuming, and accordingly quite expensive to employ. Also, such shims do not provide for caster adjustment.

SUMMARY OF THE INVENTION

The present invention, which provides a heretofore unavailable ease and accuracy in adjusting both camber and/or caster in solid axle vehicles having steerably mounted wheels, whether four-wheel drive or not, comprises an offset and/or skewed bushing which may be conveniently positioned in one or both yoke supports for the ball joint. By choosing an appropriate skewed and/or offset bushing, the steering knuckle may be adjusted over a wide range orthogonal to the axis of the ball joint support in the yoke.

Accordingly, an object of the present invention is to provide a new improved method in apparatus for adjusting caster and camber in solid steerable, solid axle vehicle suspension systems.

Another object of the present invention is to provide a new and improved caster and/or camber adjustment means for solid axle vehicles which may be conveniently installed in the system.

Yet another object of the invention is to provide a new and improved camber and/or caster adjusting system for steerable solid axle vehicle suspension systems which provide a wide range of adjustment.

Still another object of the present invention is to provide a new and improved caster and/or camber adjustment system in which a single component can selectively provide caster and/or camber adjustment.

These and other objects and features of the present invention will become apparent from the following description.

DETAILED DESCRIPTION OF THE INVENTION

Figure 1:
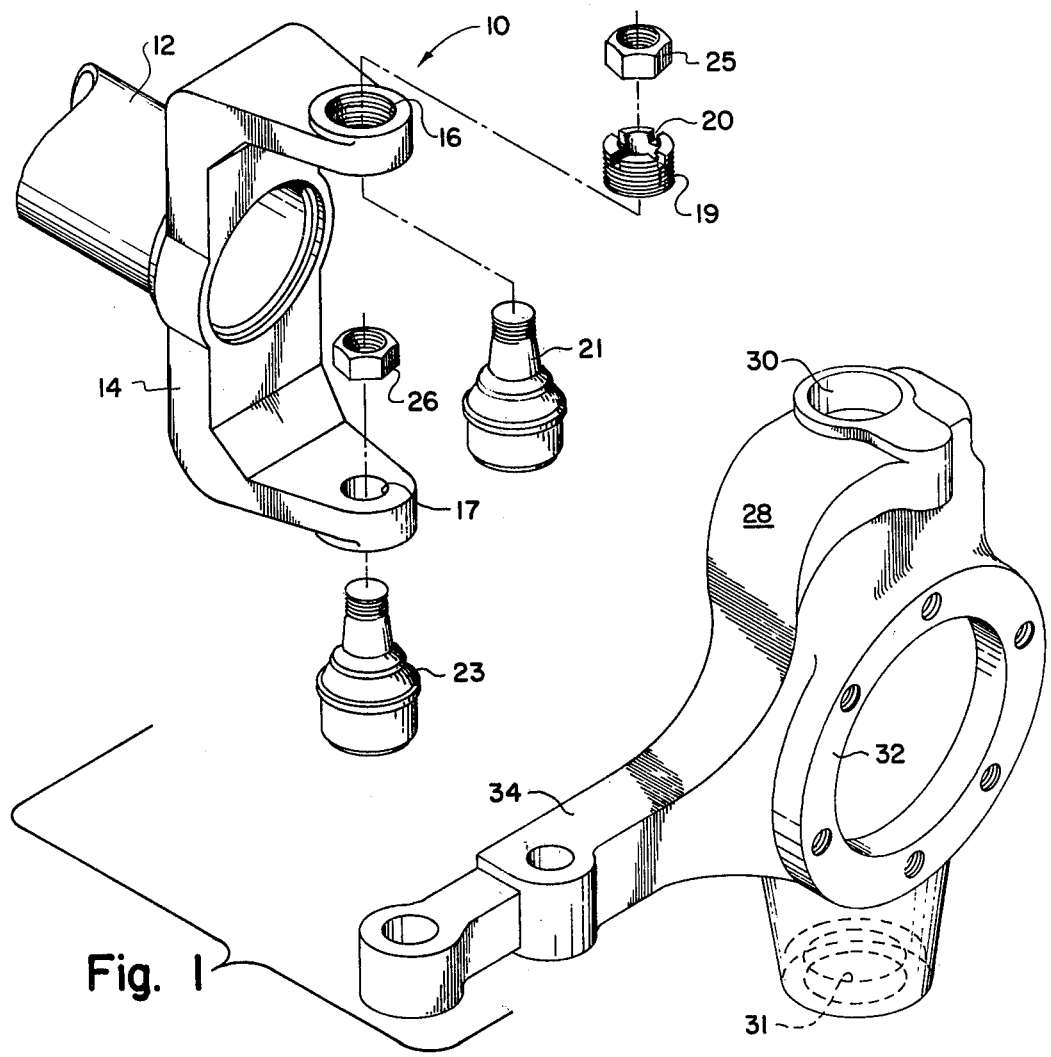
FIG. 1 is an exploded, perspective view of a typical solid axle, yoke and steering knuckle arrangement employing ball joints.

Turning now to the drawings, wherein similar elements are designated by like reference numerals throughout the various figures, a steering assembly according to the instant invention is illustrated in FIG. 1 and generally designated by the reference numeral 10. As shown in FIG. 1, steering assembly 10 includes axle housing 12, which, as illustrated, is hollow and adapted to enclose a driving axle not shown for a four-wheel drive vehicle, but for the purposes of the invention is substantially equivalent to a solid axle. Yoke 14 is fixedly mounted to axle housing 12 and carries upper ball joint housing 16 and lower ball joint housing 17.

Upper ball joint housing 16 is enlarged and threaded to receive bushing 19, which includes slots 20 to assist in engaging the threads of bushing 19 with the threads of upper ball joint housing 16. As illustrated, lower ball joint housing 17 is a tapered opening, but optionally could be of a similar structure to that of upper ball joint housing 16 in which instance a bushing would be threaded therein. Upper ball joint 21 fits with the tapered portion thereof in the tapered interior opening of bushing 19 while lower ball joint 23 engages lower ball joint housing 17 with the tapered portion of lower ball joint 23 engaging the tapered portion of lower ball joint housing 17 defined directly in yoke 14. Nuts 25 and 26 may be threaded onto the complimentary threaded portions of ball joints 21 and 23 to secure the ball joints in yoke 14.

Of course the structure of ball joints is well known. Stated succinctly, ball joints 21 and 23 include a ball moveably carried in a housing and having a threaded and tapered portion extending therefrom. The housing of upper ball joint 21 is secured to steering knuckle 28 at upper ball joint support 30 by, for instance, a press fit at support opening 30. Lower ball joint 23 is similarly secured to steering knuckle 28 at lower ball joint support 31 as shown in FIG. 1.

Steering knuckle 28 includes spindle pad 32 and steering arm 34 to, respectively, mount a spindle portion (not shown) thereto to carry a hub and wheel assembly, and to provide for movement of steering knuckle 28 relative to yoke 14 for purposes of steering. Such structure is well known and will not be described in burdensome detail in that such detail is not necessary for understanding of the invention. However, references made to U.S. Letters Pat. No. 4,037,680 which describes and illustrates in detail a four-wheel drive steerable solid axle arrangement such as that to which the instant invention pertains.

Figure 2:
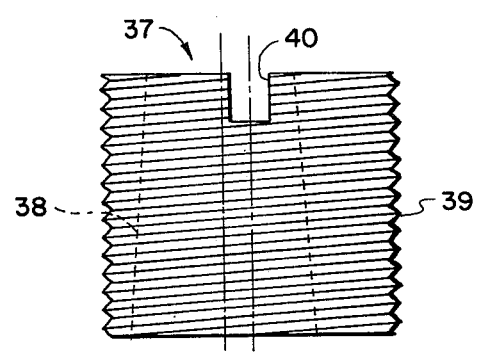
FIG. 2 is a side view of an offset bushing in accord with the instant invention.

As shown in FIG. 2, an offset bushing, adapted to fit in upper ball joint housing 16 as shown in FIG. 1, is illustrated. Offset bushing 37 includes a tapered internal bore 38 and a threaded exterior 39. Slot 40 is provided centrally at an upper portion of offset bushing 37 to assist in threading offset bushing 37 into upper ball joint housing 16, and, if desired, to provide an index mark for positioning. It should be noted that the center line of the threaded exterior portion 39 of offset bushing 37 is centrally located while the center line of tapered bore 38 is offset therefrom. As will be described in more detail below, offset bushing 37 may be positioned in upper ball joint housing 16 of yoke 14 to provide caster and/or camber adjustment as a function of the offset of tapered bore 38 relative to the exterior of offset bushing 37, and the angular position of offset bushing 37 in upper ball joint housing 16.

Figure 3:
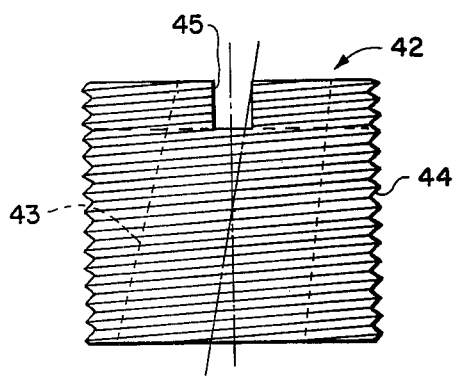
FIG. 3 is a side view of a skewed bushing in accord with the instant invention.

A similar but varied asymetrical bushing is illustrated in FIG. 3 whereat skewed bushing 42 is illustrated. Again tapered bore 43 is provided internally of skewed bushing 42, threaded outer portion 44 is defined and slots 45 are defined in the upper portion thereof. However, in the instance of skewed bushing 42, the center line of tapered bore 43 is disposed at an angle to the center line of threaded portion 44 of skewed bushing 42. Such skewed relationship of tapered bore 43 provides for more exaggerated adjustment of caster and camber, but fundmentally is again a function of the amount of angular skewing and angular position of skewed bushing 42 in upper ball joint housing 16 of yoke 14.

Figure 4:
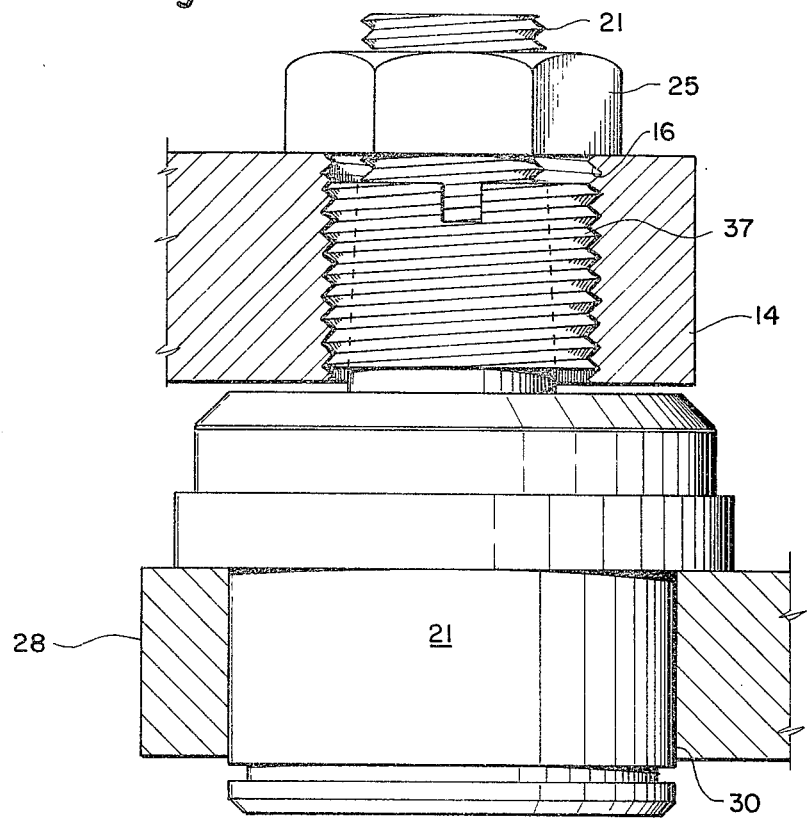
FIG. 4 is a partially sectioned view of the offset bushing of FIG. 2 installed in the yoke of FIG. 1.

The function of offset bushing 37 illustrated in FIG. 2 will be more readily understood with reference to FIG. 4, wherein offset bushing 37 is illustrated as threaded into yoke 14 at upper ball joint housing 16. Nut 25 threads onto the threaded portion of ball joint 21 to secure the upper portion of ball joint 21 in tapered bore 38 of ball joint 21. Since offset bushing 37 positions ball joint 21 with a radial displacement within offset bushing 37, repositioning of steering knuckle 28, carrying the base of ball joint 21, relative to yoke 14, carrying upper ball joint housing 16 and offset bushing 37, is accomplished. If offset bushing 37 is positioned within upper ball joint housing 16 with the offset substantially inward or outward of the symmetrical position provided by conventional bushing 19, camber is adjusted by accordingly moving inward or outward the upper portion of steering knuckle 28, relative to yoke 14 with negative camber being provided by inward movement of the upper portion of steering knuckle 28 relative to yoke 14. On the other hand, if offset bushing 37 is positioned with the offset substantially forward or rearward within upper ball joint housing 16, the upper portion of steering knuckle 28 at upper ball joint support 30 is repositioned forward or rearward relative to yoke 14 thereby providing adjustment of caster with rearward movement of the upper portion of steering knuckle 28 providing positive caster adjustment. If both caster and camber are to be concurrently adjusted, offset bushing 37 may be angularly positioned within upper ball joint housing 38 with the offset in neither pure lateral or pure forward and rearward orientation thereby concurrently providing both caster and camber adjustment. In practice, the specific geometry and spacing of steering knuckle 28 relative to yoke 14 of any given vehicle will be known, and accordingly a chart may be provided indicating the amount of offset required and the orientation of the bushings 37 within upper ball joint housing 16 as is appropriate to provide any of a multitude of corrective settings.

Figure 5:
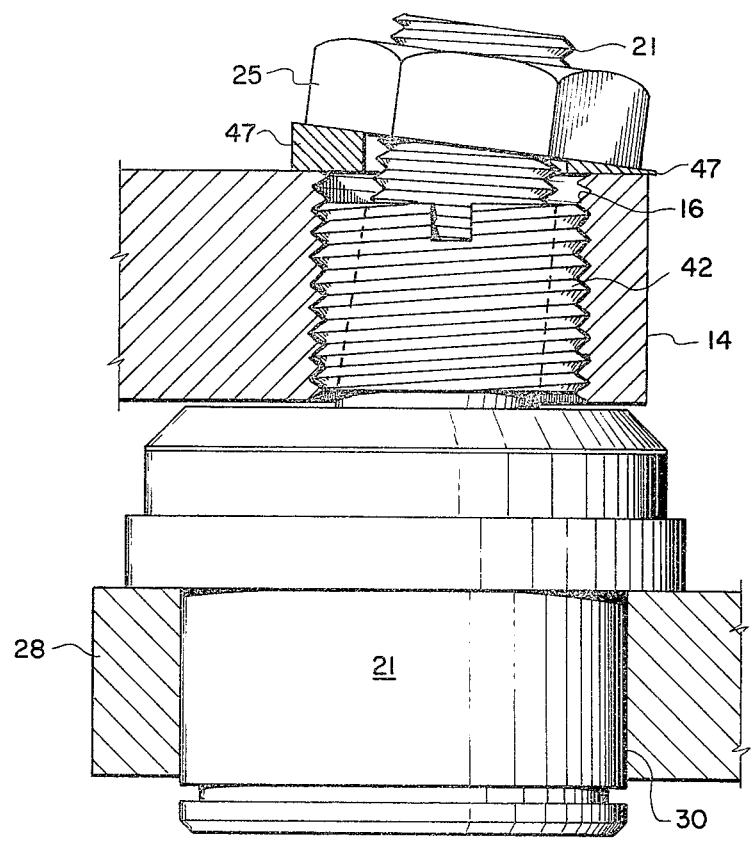
FIG. 5 is a partially sectioned view of the skewed bushing of FIG. 3 installed in the yoke housing of FIG. 1.

It will be noted from FIG. 4, that the offset adjustment available with offset bushing 37 is limited by the outer diameter of offset bushing 37 in that steering knuckle 28 at upper ball joint support 30 is moved only the distance offset of offset bushing 37. At some finite offset, tapered bore 38 will, in theory, be positioned outside of threaded portion 39 of offset bushing 37. However, as shown in FIG. 5, skewed bushing 42 provides for more exaggerated adjustments. The effective positioning of upper ball joint support 30 is substantially at the intersection of the center line of skewed bushing 42 extended to the point of rotation of the ball of ball joint 21. Thus it is possible to physically locate upper ball joint 30 at a position which, as described above, would not be possible as a result of the physical limitations offset bushing 37. However, as a result of the skewed relationship of tapered bore 43 of offset bushing 42, shim member 47 which is essentially a washer ground with nonparallel surfaces, is interposed between nut 25 and the upper surface of yoke 14. Again, the specific adjustment afforded by skewed bushing 42 is a function of the physical offset, if any, skew angle and orientation of skewed bushing 42 within upper ball joint housing 16. The above discussion concerning caster and/or camber adjustment applies equally here.

In operation, the caster and camber of a steerable front wheel of a vehicle having the appropriate solid axle and ball joint arrangement as described above is measured by conventional alignment equipment. Misalignment with regard to caster and/or camber is noted. An appropriate offset bushing or skewed bushing is selected, most conveniently by means of a chart but alternatively by way of a formula or graph, the upper ball joint bushing is removed from the upper ball joint. The ball joint need not be removed. The selected offset bushing or skewed bushing is then positioned in the upper ball joint housing with the tapered bore receiving the ball joint and oriented by means of an indexing mark, which may conveniently be a slot to assist in threading the bushing into the housing, and the ball joint is reassembled and secured. In the instance of a skewed bushing, a shim washer is inserted to assist in securely seating the ball joint nut. In such a manner, caster and/or camber may be readily, accurately and conveniently adjusted in a manner which will not compromise the stability of the adjustment, and provide for convenient readjustment if required.

In practice, most ball joint bushings are slit longitudinally. The bushing of the instant invention may be similarly slit with the slit at the thin wall section of the bushing for indexing convenience and strength.

While the invention has been particularly described with regard to adjustment of the upper ball joint since this has been found to be most convenient and capable of providing sufficient adjustment in most instances, it is of course possible to alter the structure to provide for such bushings in both the upper and lower ball joints.

While only preferred forms and embodiments of this invention have been illustrated and described, it will be apparent to those skilled in the art that changes and modifications may be made without the deviating from the scope of the invention as defined by the following claims.

What is claimed is:

1. In a steerable structure for vehicles in which a steering member, adapted to support a spindle and a journaled wheel is rotatably carried by a support member through at least one ball joint having a movable shaft portion, the improvement comprising at least one bushing having a substantially cylindrical outer surface and an axis thereof, and an inner bore symmetrically defined in the bushing around an inner bore axis, the cylindrical axis and the inner bore axis being skewed relative to one another, the bushing being positioned in the support member with the inner bore of the bushing receiving the shaft portion of a ball joint mounted to the steering member, whereby the caster and camber of the steerable structure may be adjusted by means of the bushing by changing the relative position of the steering member and adjacent portion of the support member by means of such bushing.

2. An improvement as set forth in claim 1 in which the cylindrical outer surface of the bushing is threaded.

3. An improvement as set forth in claim 2 in which slots are defined in the bushing substantially perpendicular to the cylindrical axis of the bushing.

4. An improvement as set forth in claim 1 in which the axis of the inner bore is parallel to but offset from the cylindrical axis of the bushing.

5. An improvement as set forth in claim 1 in which the inner bore is tapered to receive a tapered shaft of a ball joint.

6. In a solid axle, steerable structure in which a steering knuckle carrying a spindle and wheel journaled to the spindle is rotatably carried in a yoke by a pair of upper and lower ball joints having movable shafts extending therefrom, the improvement comprising a bushing having a substantially cylindrical outer surface with threads defined thereon and a central cylindrical axis, the bushing being threaded into complimentary threads defined in the yoke, and a tapered inner bore symmetrically defined in the bushing around an inner bore axis and receiving a tapered movable shaft of a ball joint mounted to the steering knuckle, the cylindrical axis and the inner bore axis being skewed relative to one another, whereby the skewed axes serve to change caster and camber relationships by changing the relative positions of the yoke and steering knuckle.

7. A steering system comprising a solid axle having at each end thereof a yoke member, a steering knuckle having a spindle mounted thereto and carrying a wheel rotatably thereon, the steering knuckle being rotatably mounted to the yoke by upper and lower ball joints each having a base portion and a moveable shaft portion, the base portion of the ball joints being mounted to the steering knuckle and the shaft portions being carried in the yoke, and at least one bushing having a cylindrical outer surface mounted to the yoke and including an inner bore defined therein and having an axis skewed from the axis of the cylindrical outer surface, the bushing being positioned to receive the shaft portion of at least one ball joint.

8. A bushing adapted to correct the alignment of a steerable structure for vehicles in which a steering member is rotatably carried by a support member through at least one ball joint, the bushing comprising a cylindrical member having a central axis, and an inner bore defined in the cylindrical member and having an inner bore axis, the inner bore axis and the cylindrical axis being skewed relative to one another.

9. A bushing as set forth in claim 8 in which the cylindrical outer surface of the bushing is threaded.

10. A bushing as set forth in claim 9 in which slots are defined in an end of the bushing substantially perpendicular to the cylindrical axis of the bushing.

11. A bushing as set forth in claim 8 in which the inner bore is tapered symmetrically at the inner bore axis.

12. A method of correcting caster and camber in vehicles having an elongated solid axle, a yoke attached to at least one end of the solid axle, a steering knuckle adapted to support a spindle and journaled wheel carried by the yoke through upper and lower ball joints, the method comprising:
  measuring the alignment between the steering knuckle and the yoke;
  determining the variation of alignment between the steering knuckle and yoke from that desired;
  inserting a selected offset bushing having a cylindrical outer surface formed around a cylindrical axis and an inner bore formed symmetrically around an inner bore axis, the cylindrical axis and the inner bore axis being skewed relative to one another; and
  positioning a shaft from a ball joint carried on the spindle in the inner bore to thereby adjust the alignment between the yoke and the steering knuckle.

13. A method as set forth in claim 12 in which the offset between the cylindrical axis and inner bore axis is disposed in a direction parallel to the length of the axle whereby camber is adjusted.

14. A method as set forth in claim 12 in which the offset between the cylindrical axis and inner bore axis is disposed in a direction perpendicular to the length of the axle whereby caster is adjusted.

15. A method as set forth in claim 12 in which the offset between the cylindrical axis and inner bore axis is disposed in a direction having components both parallel to and perpendicular to the length of the axle whereby both camber and caster are concurrently adjusted.

* * * * *